(12) United States Patent
Lin

(10) Patent No.: US 9,736,990 B2
(45) Date of Patent: Aug. 22, 2017

(54) GARDENING SHEARS WITH IMPROVED SHEARING EFFICIENCY

(71) Applicant: Thomas Lin, Taichung (TW)

(72) Inventor: Thomas Lin, Taichung (TW)

( * ) Notice: Subject to any disclaimer, the term of this patent is extended or adjusted under 35 U.S.C. 154(b) by 0 days.

(21) Appl. No.: 15/014,521

(22) Filed: Feb. 3, 2016

(65) Prior Publication Data

US 2016/0270299 A1 Sep. 22, 2016

(30) Foreign Application Priority Data

Mar. 17, 2015 (TW) .............................. 104108438 A

(51) Int. Cl.
*A01G 3/025* (2006.01)

(52) U.S. Cl.
CPC ........... *A01G 3/0251* (2013.01); *A01G 3/025* (2013.01)

(58) Field of Classification Search
CPC .............................. A01G 3/025; A01G 3/0251
USPC ........................................................... 30/251
See application file for complete search history.

(56) References Cited

U.S. PATENT DOCUMENTS

| | | | | |
|---|---|---|---|---|
| 2,520,905 A * | 9/1950 | Borrelli | ..................... | A01G 3/02 30/237 |
| 3,390,455 A * | 7/1968 | Florian | ................. | B23D 29/026 30/190 |
| 3,851,389 A * | 12/1974 | Swanson | .............. | B23D 29/026 30/250 |
| 4,696,107 A * | 9/1987 | Held | ..................... | A01G 3/0255 30/187 |
| 7,434,497 B2 * | 10/2008 | Caravello | ................. | B25B 7/16 81/364 |
| 8,166,659 B2 * | 5/2012 | Huang | .................... | B26B 13/26 30/190 |
| 9,591,808 B2 * | 3/2017 | Lin | ........................ | A01G 3/0251 |
| 2011/0126415 A1 * | 6/2011 | Huang | .................... | B26B 13/26 30/254 |
| 2013/0031786 A1 * | 2/2013 | Wang | ..................... | A01G 3/021 30/251 |
| 2014/0053413 A1 * | 2/2014 | Huang | ................. | A01G 3/0251 30/250 |

(Continued)

FOREIGN PATENT DOCUMENTS

DE 20 2016 100 465 U1 * 6/2016
GB 2498829 * 1/2015
WO WO 2016/191898 A1 * 12/2016

*Primary Examiner* — Hwei C Payer
(74) *Attorney, Agent, or Firm* — Muncy, Geissler, Olds & Lowe, P.C.

(57) ABSTRACT

A gardening shears includes two handles, a first shear blade connected to one handle and providing a suspension arm portion, a linking rod connected to the other handle, a second shear blade coaxially pivoted to the first shear blade and the linking rod and providing an elongated slot, and a control unit including an arched guide member fixedly connected with its one end to the linking rod and a guide wheel pivotally connected to the suspension arm portion of the first shear blade with a guiding protrusion thereof inserted into the elongated slot of the second shear blade. Thus, when opening and closing the handles, the mating arrangement of the arched guide member, the guide wheel and the elongated slot of the second shear blade enables the first and second shear blade to implement the shearing action twice.

5 Claims, 5 Drawing Sheets

(56) References Cited

U.S. PATENT DOCUMENTS

2014/0215834 A1* 8/2014 Wang .................. A01G 3/0251
30/251
2016/0270299 A1* 9/2016 Lin ...................... A01G 3/0251
2016/0345506 A1* 12/2016 Lin ........................ B26B 13/28

* cited by examiner

GARDENING SHEARS WITH IMPROVED SHEARING EFFICIENCY

BACKGROUND OF THE INVENTION

1. Field of the Invention

The present invention relates to garden tools and more particularly, to gardening shears that significantly improves the shearing efficiency.

2. Description of the Related Art

Conventional gardening shears generally comprise two shear blades pivotally connected together, and two handles respectively connected to respective bottom ends of the shear blades. Moving the two handles with the two hands in direction toward each other can drive the two shear blades to cut branches.

However, after one shearing action, the user needs to pull the two handles outwards to open the two shear blades for a next shearing action, i.e., the user needs to open the two handles and then close them so as to complete one shearing action. It is quite laborious to perform this operation mode for a long time. The shearing efficiency of conventional garden shears needs to be improved.

SUMMARY OF THE INVENTION

The present invention has been accomplished under the circumstances in view. It is one object of the present invention to provide a gardening shears, which has a simple structure, facilitates operation with less effort, and significantly improves the shearing efficiency.

To achieve this and other objects of the present invention, a gardening shears comprises two handles, a linking rod, a first shear blade, a second shear blade, and a control unit. The linking rod has a bottom end thereof connected to a top end of one handle. The first shear blade comprises a first cutting blade portion, a connection portion, and a suspension arm portion. The first cutting blade portion has a bottom end thereof pivotally connected to a top end of the linking rod. The connection portion is extended from the bottom end of the first cutting blade portion and connected to a top end of the other handle. The suspension arm portion is extended from an inner peripheral edge of the connection portion in direction toward the linking rod. The second shear blade comprises a second cutting blade portion and a bearing portion. The second cutting blade portion has a bottom end thereof coaxially pivotally connected to the top end of the linking rod and the bottom end of the first cutting blade portion of the first shear blade. The bearing portion is extended from the bottom end of the second cutting blade portion in direction toward the suspension arm portion of the first shear blade, defining therein an elongated slot. The control unit comprises an arched guide member and a guide wheel. The arched guide member has one end thereof fixedly connected to the linking rod. The guide wheel is pivotally mounted at a distal end of the suspension arm portion of the first shear blade and rotatably supported on the arched guide member. The guide wheel has a guide protrusion located at one side thereof that faces toward the second shear blade. The guiding protrusion is slidably inserted in the elongated slot of the bearing portion of the second shear blade. Thus, when moving the two handles from a closed position to an extended position, the guide wheel will be forced to rotate along the arched guide member and also to move along the elongated slot of the second shear blade. During movement, the guide wheel will push the lateral walls of the elongated slot, causing the first shear blade and the second shear blade to implement a shearing action twice, achieving labor saving and improving the shearing efficiency.

In a first embodiment of the present invention, the length of the elongated slot of the second shear blade is greater than one half the length of the bearing portion of the second shear blade; the arched guide member comprises a toothed portion; the guide wheel comprises a gearwheel and a wheel cover. The gearwheel of the guide wheel is pivotally mounted at a distal end of the suspension arm portion of the first shear blade and meshed with the toothed portion of the arched guide member. The wheel cover is connected to one side of the gearwheel, comprising an extension portion. The guiding protrusion is located at a distal end of the extension portion. During rotation of the gearwheel along the toothed portion of the arched guide member, the wheel cover is synchronously rotated, forcing the guiding protrusion to push the elongated slot of the bearing portion of the second shear blade, and thus, the first and second shear blades can be driven to implement a shearing action.

In a second embodiment of the present invention, the length of the elongated slot of the second shear blade is less than one half the length of the bearing portion of the second shear blade; the arched guide member comprises a toothed portion located at a top side thereof; the guide wheel comprises a gearwheel and a wheel cover. The gearwheel is pivotally mounted at a distal end of the suspension arm portion of the first shear blade and meshed with the toothed portion of the arched guide member. The wheel cover is connected to one side of the gearwheel, comprising a guiding protrusion. During rotation of the gearwheel along the toothed portion of the arched guide member, the wheel cover is synchronously rotated, forcing the guiding protrusion to push the elongated slot of the bearing portion of the second shear blade, and thus, the first and second shear blades can be driven to implement a shearing action.

Other advantages and features of the present invention will be fully understood by reference to the following specification in conjunction with the accompanying drawings, in which like reference signs denote like components of structure.

DETAILED DESCRIPTION OF THE PREFERRED EMBODIMENT

Figure 1:
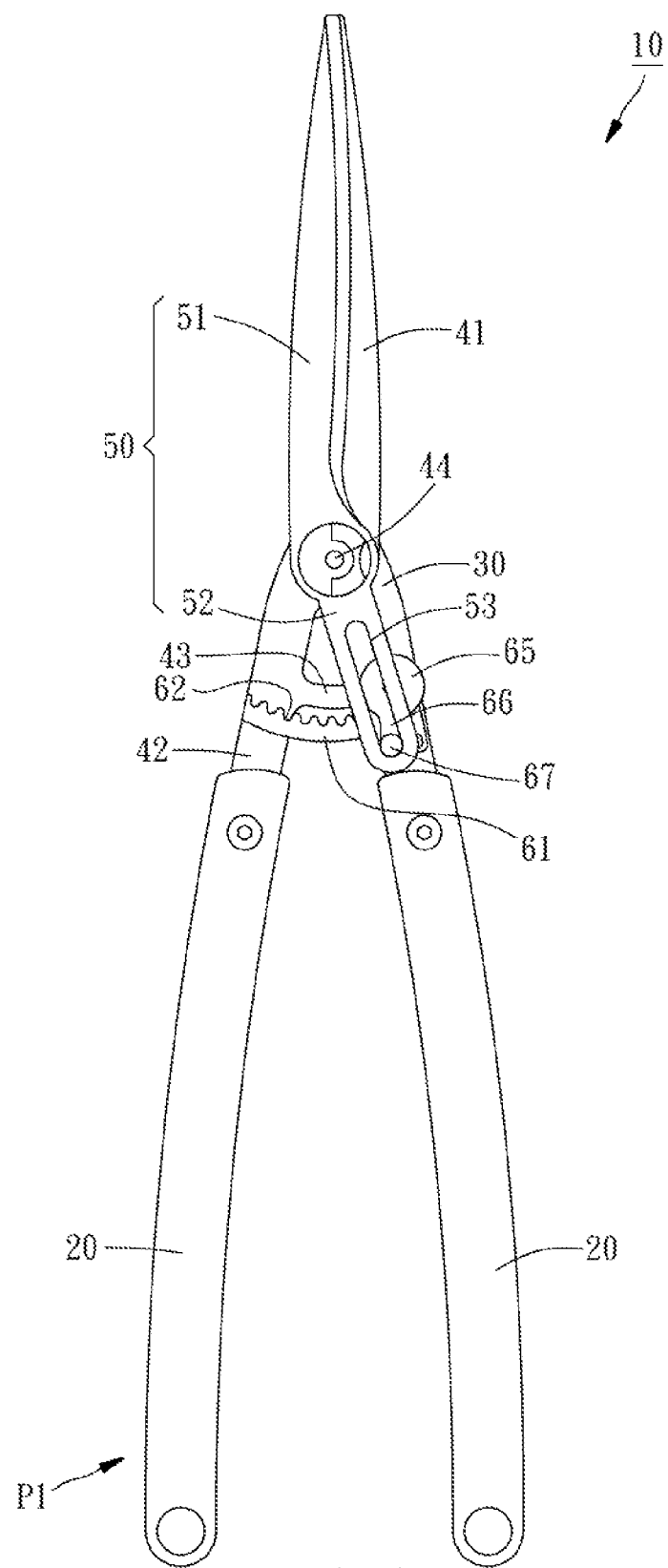
FIG. 1 is a structural plain view of a garden shears in accordance with a first embodiment of the present invention.
Figure 2:
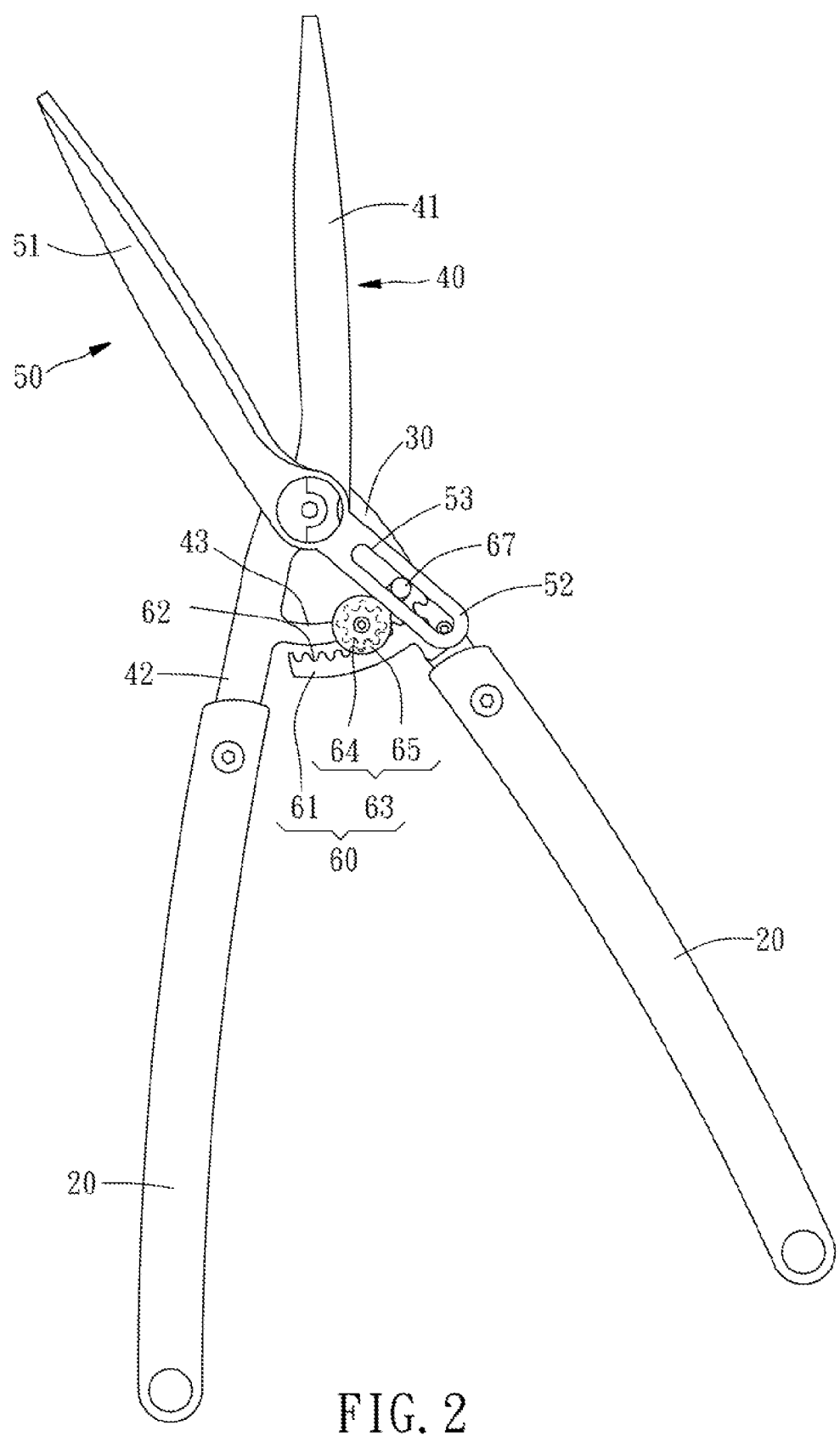
FIG. 2 is similar to FIG. 1, illustrating the gap between the first and second shear blades reached the maximum opening angle.

Referring to FIGS. 1 and 2, a gardening shears 10 in accordance with a first embodiment of the present invention is shown. The gardening shears 10 comprises two handles 20, a linking rod 30, a first shear blade 40, a second shear blade 50, and a control unit 60.

The linking rod 30 has a bottom end thereof fixedly connected to a top end of one handle 20.

The first shear blade 40 comprises a first cutting blade portion 41, a connection portion 42, and a suspension arm portion 43. The first cutting blade portion 41 has a bottom end thereof pivotally connected to an opposing top end of the linking rod 30 with a pivot 44. The connection portion 42 is extended from the bottom end of the first cutting blade portion 41 and connected to a top end of the other handle 20. The suspension arm portion 43 is extended from an inner peripheral edge of the connection portion 42 in direction toward the linking rod 30.

The second shear blade 50 comprises a second cutting blade portion 51, and a bearing portion 52. The second cutting blade portion 51 has a bottom end thereof pivotally connected to the top end of the linking rod 30 and the bottom end of the first cutting blade portion 41 of the first shear blade 40 with a pivot 44. The bearing portion 52 is extended from the bottom end of the second cutting blade portion 51 in direction toward the suspension arm portion 43 of the first shear blade 40, comprising an elongated slot 53. The length of the elongated slot 53 is greater than one half of the length of the bearing portion 52 of the second shear blade 50.

The control unit 60 comprises an arched guide member 61 and a guide wheel 63. The arched guide member 61 has one end thereof fixedly connected to the linking rod 30, and an opposite end thereof extending in direction toward the first shear blade 40. Further, the arched guide member 61 has a toothed portion 62 extending along a top edge thereof. The guide wheel 63 comprises a gearwheel 64 and a wheel cover 65. The gearwheel 64 is pivotally mounted at a distal end of the suspension arm portion 43 of the first shear blade 40 and meshed with the toothed portion 62 of the arched guide member 61. The wheel cover 65 is coaxially connected to one side of the gearwheel 64 that faces toward the second shear blade 50, comprising an extension portion 66 and a guiding protrusion 67. The guide protrusion 67 is located at a distal end of the extension portion 66 and inserted into the elongated slot 53 of the bearing portion 52 of the second shear blade 50.

Figure 3:
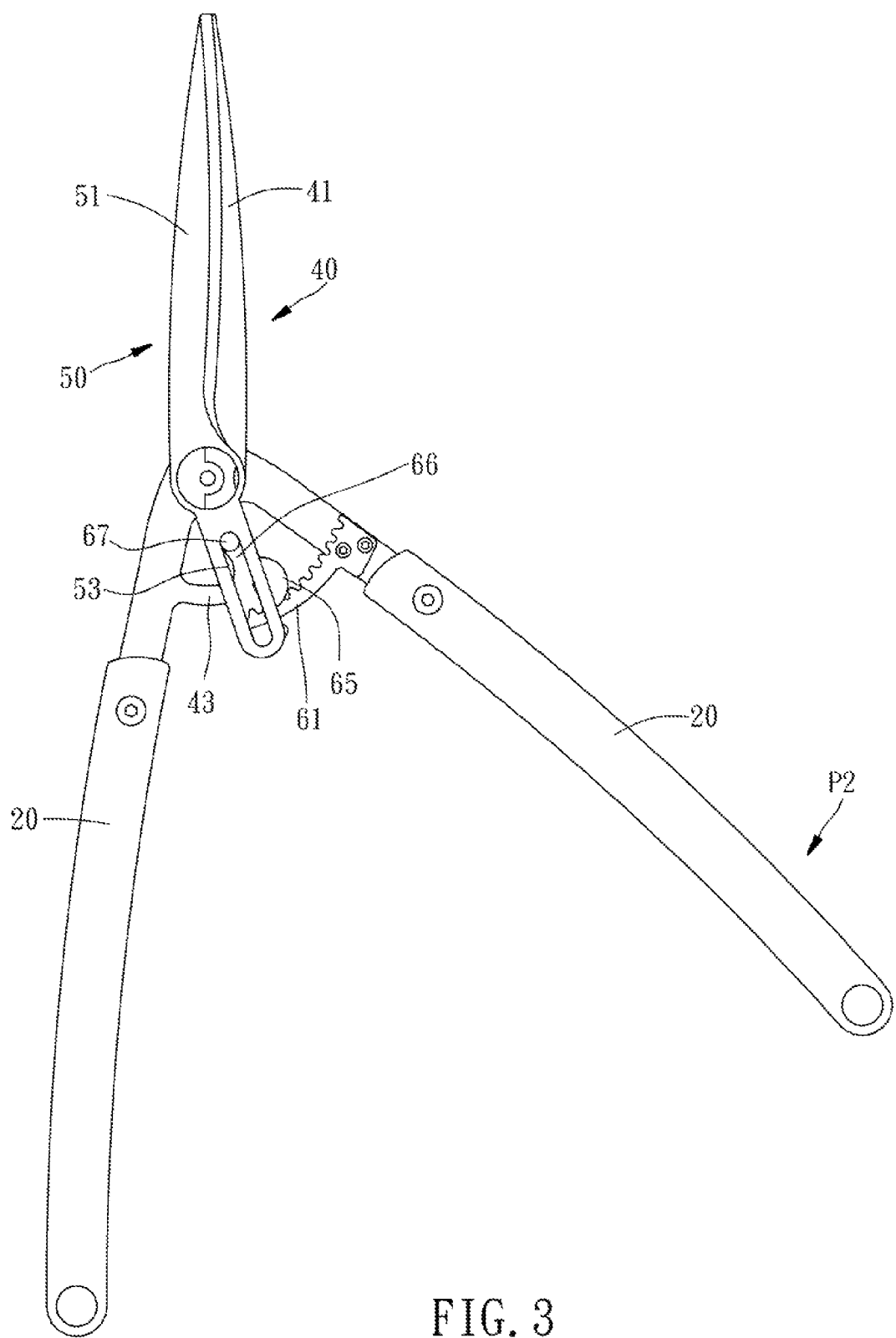
FIG. 3 is similar to FIG. 2, illustrating the two handles in the extended position and the first and second shear blades abutted against each other.

From the above-described structure we can see that, when pulling the two handles 20 outwardly from an initial position P1 to an extended position P2, the first shear blade 40 will, at first, be driven to carry the gearwheel 64 along the arched guide member 61 in direction away from the linking rod 30 via the suspension arm portion 43, as shown in FIG. 2. During rotational movement of the gearwheel 64 along the arched guide member 61, the wheel cover 65 will be biased, causing the guiding protrusion 67 of the wheel cover 65 to push the right lateral wall of the elongated slot 53 of the second shear blade 50 and to move upwardly toward a top end of the elongated slot 53 of the second shear blade 50. At this time, the second cutting blade portion 51 of the second shear blade 50 will be gradually biased in direction away from the first cutting blade portion 41 to open the gap between the first cutting blade portion 41 of the first shear blade 40 and the second cutting blade portion 51 of the second shear blade 50. When the gearwheel 64 reaches the midpoint of the arched guide member 61 during its rotational movement, as shown in FIG. 2, the guiding protrusion 67 of the wheel cover 65 will also reach the midpoint of the elongated slot 53 of the second shear blade 50. At this time, the gap between the first cutting blade portion 41 of the first shear blade 40 and the second cutting blade portion 51 of the second shear blade 50 reaches the maximum opening angle. When continuously pulling the two handles 20 outwardly toward the extended position P2, the gearwheel 64 will be continuously moved in direction away from the linking rod 30, and, the wheel cover 65 will also be continuously biased with the rotation of the gearwheel 64. At this time, the guiding protrusion 67 of the wheel cover 65 will move upwardly along the elongated slot 53 of the second shear blade 50 and will also push the left lateral wall of the elongated slot of the second shear blade 50. Thus, the second cutting blade portion 51 of the second shear blade 50 will be forced to bias gradually in direction toward the first cutting blade portion 41 of the first shear blade 40. As soon as the gearwheel 64 reaches the end of the arched guide member 61, as shown in FIG. 3, the guiding protrusion 67 of the wheel cover 65 will also reach the top end of the elongated slot 53 of the second shear blade 50. At this time, the two handles 20 reach the extended position P2 where the first cutting blade portion 41 of the first shear blade 40 and the second cutting blade portion 51 of the second shear blade 50 are abutted against each other, completing a primary shearing action.

After completion of one shearing action, apply a pressure to the two handles 20 to move them inwardly from the extended position P2 toward the initial position P. In this process, the first shear blade 40 will first carry the gearwheel 64 to move along the arched guide member 61 in direction toward the linking rod 30. During the rotational movement of the gearwheel 64 toward the linking rod 30, the guiding protrusion 67 of the wheel cover 65 will push the right lateral wall of the elongated slot 53 of the second shear blade 50 and will also move downwardly along elongated slot 53 of the second shear blade 50, thereby gradually opening the gap between the first cutting blade portion 41 of the first shear blade 40 and the second cutting blade portion 51 of the second shear blade 50. When the gearwheel 64 reaches the midpoint of the arched guide member 61 (see FIG. 2), the gap between the first cutting blade portion 41 of the first shear blade 40 and the second cutting blade portion 51 of the second shear blade 50 reaches the maximum opening angle. When continuously moving the two handles 20 inwardly toward each other, the guiding protrusion 67 of the wheel cover 65 will continuously push the left lateral wall of the elongated slot 53 of the second shear blade 50 and will also move downwardly along the elongated slot 53 of the second shear blade 50. At this time, the second cutting blade portion 51 of the second shear blade 50 will be gradually moved toward the first cutting blade portion 41 of the first shear blade 40. When the handles 20 reach the initial position P1 shown in FIG. 1, the first cutting blade portion 41 of the first shear blade 40 and the second cutting blade portion 51 of the second shear blade 50 are abutted against each other again, completing a secondary shearing action.

It can be seen from the above, moving the two handles 20 of the gardening shears 10 from the initial position P1 to the extended position P2 can drive the first shear blade 40 and the second shear blade 50 to implement one shearing action, and, returning the two handles 20 from the extended position P2 to the initial position P1 can drive the first shear blade 40 and the second shear blade 50 to implement another shearing action, i.e., operating the two handles 20 through one opened and closed cycle can drive the first and second shear blade 40,50 to implement the shearing action twice. When compared with the conventional techniques, the operation of the gardening shears 10 requires less effort, significantly improving the operational efficiency.

Figure 4:
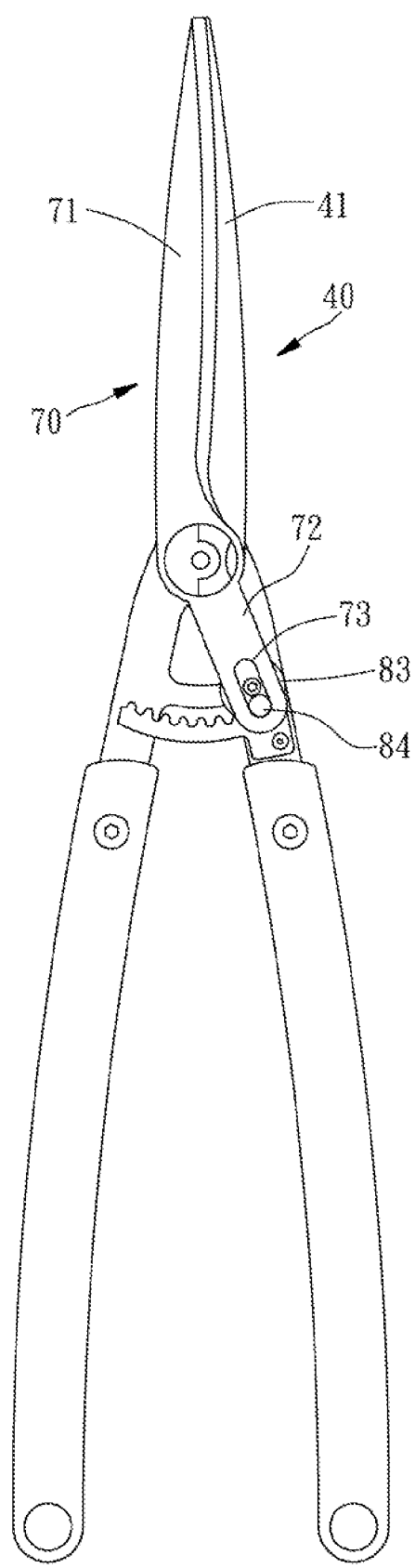
FIG. 4 is a structural plain view of a garden shears in accordance with a second embodiment of the present invention.
Figure 5:
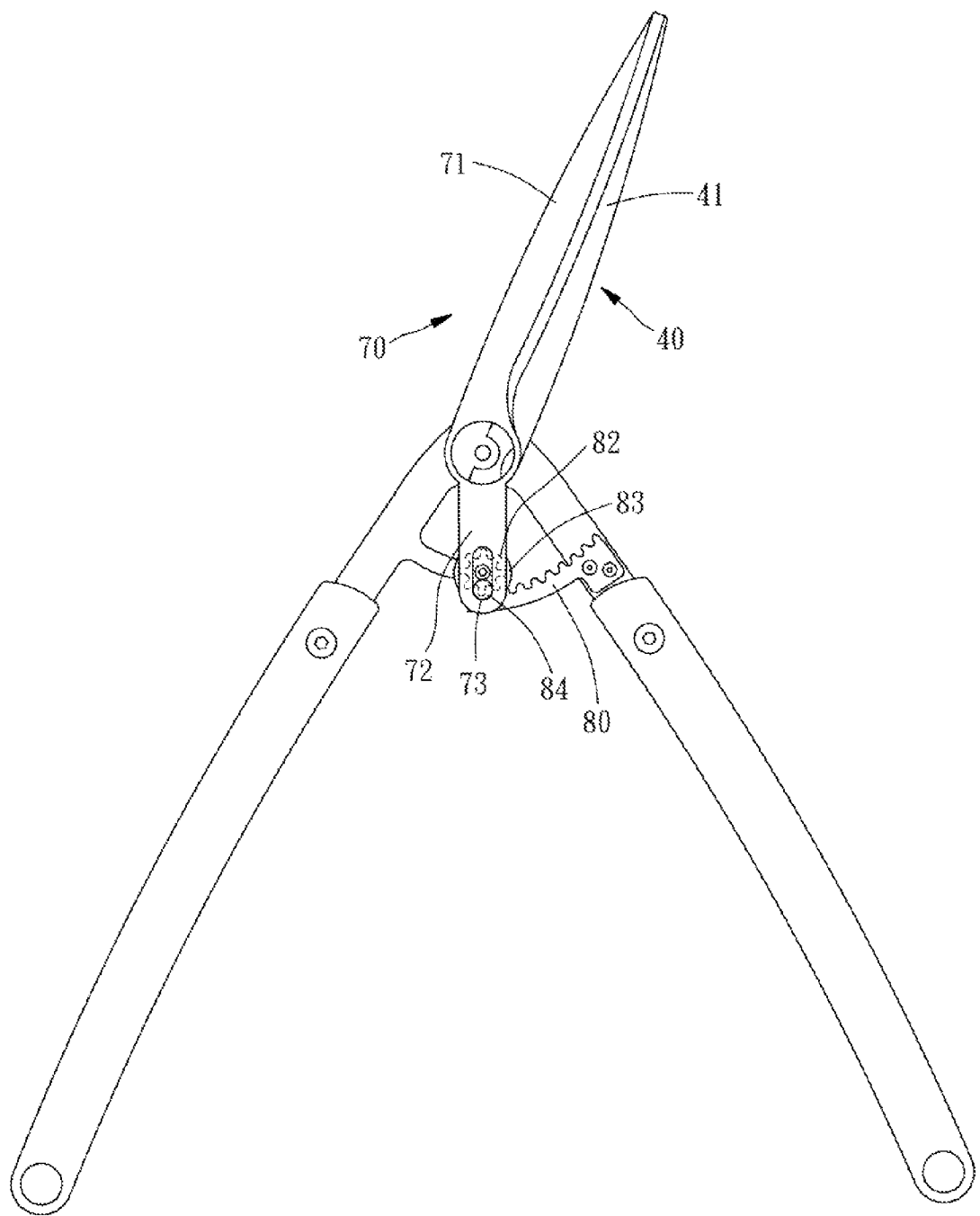
FIG. 5 is similar to FIG. 4, illustrating the two handles in the extended position and the first and second shear blades abutted against each other.

Further, the structure of the present invention can be variously embodied. For example, in a second embodiment of the present invention as shown in FIGS. 4 and 5, the length of the elongated slot 73 of the second shear blade 70 is shortened and less than one half the length of the bearing portion 72 of the second shear blade 70; in order to mate with the length of the elongated slot 73, the wheel cover 83 eliminates the design of the aforesaid extension portion, and, the guiding protrusion 84 is directly mounted at one side of the wheel cover 83 that faces toward the second shear blade 70. Thus, the travel distance of the movement of the guiding protrusion 84 of the wheel cover 83 during rotational movement of the gearwheel 82 along the arched guide member 80 can be reduced one half, shortening the maximum opening angle between the first cutting blade portion 41 of the first shear blade 40 and the second cutting blade portion 71 of the second shear blade 70 to meet different needs.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A gardening shears, comprising:
    two handles;
    a linking rod having a bottom end thereof connected to a top end of one of said handles;
    a first shear blade comprising a first cutting blade portion, a connection portion and a suspension arm portion, said first cutting blade portion having a bottom end thereof pivotally connected to an opposing top end of said linking rod, said connection portion being extended from the bottom end of said first cutting blade portion and connected to a top end of the other of said handles, said suspension arm portion being extended from an inner peripheral edge of said connection portion in direction toward said linking rod;
    a second shear blade comprising a second cutting blade portion and a bearing portion, said second cutting blade portion having a bottom end thereof pivotally connected to the top end of said linking rod and the bottom end of said first cutting blade portion of said first shear blade, said bearing portion being extended from the bottom end of said second cutting blade portion in direction toward said suspension arm portion of said first shear blade, said bearing portion defining therein an elongated slot; and
    a control unit comprising an arched guide member and a guide wheel, said arched guide member having one end thereof fixedly connected to said linking rod, said guide wheel being pivotally connected to a distal end of said suspension arm portion of said first shear blade and rotatably supported on said arched guide member, said guide wheel comprising a guiding protrusion facing toward said second shear blade and slidably inserted into said elongated slot of said bearing portion of said second shear blade.

2. The gardening shears as claimed in claim 1, wherein said arched guide member comprises a toothed portion located at a top side thereof; said guide wheel comprises a gearwheel and a wheel cover, said gearwheel being pivotally mounted at the distal end of said suspension arm portion of said first shear blade and meshed with said toothed portion of said arched guide member, said wheel cover being connected to one side of said gearwheel and comprising an extension portion; said guiding protrusion is located at a distal end of said extension portion.

3. The gardening shears as claimed in claim 2, wherein the length of said elongated slot of said second shear blade is greater than one half the length of said bearing portion of said second shear blade.

4. The gardening shears as claimed in claim 1, wherein said arched guide member comprises a toothed portion located at a top side thereof; said guide wheel comprises a gearwheel and a wheel cover, said gearwheel being pivotally mounted at the distal end of said suspension arm portion of said first shear blade and meshed with said toothed portion of said arched guide member, said wheel cover being connected to one side of said gearwheel and comprising said guiding protrusion.

5. The gardening shears as claimed in claim 4, wherein the length of said elongated slot of said second shear blade is less than one half the length of said bearing portion of said second shear blade.

\* \* \* \* \*